United States Patent [19]

Grubb et al.

[11] Patent Number: 4,473,410

[45] Date of Patent: Sep. 25, 1984

[54] NUCLEAR FUEL ELEMENT HAVING A COMPOSITE COATING

[75] Inventors: Willard T. Grubb; Lawrence H. King, both of Schenectady, N.Y.

[73] Assignee: General Electric Company, Schenectady, N.Y.

[21] Appl. No.: 308,215

[22] Filed: Oct. 5, 1981

Related U.S. Application Data

[60] Division of Ser. No. 87,547, Oct. 22, 1979, abandoned, which is a continuation-in-part of Ser. No. 820,797, Aug. 1, 1977, abandoned.

[51] Int. Cl.³ ............................................. C23C 11/00
[52] U.S. Cl. ..................................... 148/6.3; 376/417
[58] Field of Search .................... 376/416, 417; 427/5, 427/6; 148/6.3

[56] References Cited

U.S. PATENT DOCUMENTS

| | | | |
|---|---|---|---|
| 3,556,870 | 1/1971 | Debrey | 148/6.3 |
| 3,620,691 | 11/1971 | Rubel | 29/191 |
| 4,022,662 | 5/1977 | Gordon | 176/82 |
| 4,093,756 | 6/1978 | Donaghy | 148/6.24 |

Primary Examiner—Sam Silverberg
Attorney, Agent, or Firm—William A. Teoli; James C. Davis, Jr.; James Magee, Jr.

[57] ABSTRACT

A nuclear fuel element consisting of a zirconium or zirconium alloy container and nuclear fuel pellets is provided for use in the core of a nuclear reactor. The zirconium or zirconium alloy container has an inner coating of copper in proximity to the nuclear fuel, and is separated from the zirconium or zirconium alloy by an intermediate zirconium oxide diffusion barrier layer. The copper layer and the intermediate zirconium oxide diffusion barrier of the composite cladding reduce perforations or failure in the zirconium or zirconium alloy cladding substrate caused by stress corrosion cracking or metal embrittlement. Good bonding of the copper to the oxide zirconium and zirconium alloy prevents scaling of copper from the composite cladding during the loading of the fuel element with fuel pellets.

4 Claims, 2 Drawing Figures

NUCLEAR FUEL ELEMENT HAVING A COMPOSITE COATING

BACKGROUND OF THE INVENTION

This application is a division of application Ser. No. 87,547 filed Oct. 22, 1979, abandoned, which is a continuation-in-part of our copending application Ser. No. 820,797, filed Aug. 1, 1977 abandoned.

This invention relates broadly to nuclear fuel elements for use in the core of nuclear fission reactors. More particularly, the present invention relates to a zirconium containing composite cladding for nuclear fuel having a copper coating on its inner surface in proximity to the fuel and an intermediate zirconium oxide boundary layer.

Nuclear reactors are presently being designed, constructed and operated in which the nuclear fuel is contained in fuel elements which can have various geometric shapes, such as plates, tubes, or rods. The fuel material is usually enclosed in a low neutron absorbing corrosion-resistant, nonreactive, heat conductive container or cladding. The elements are assembled together in a lattice at fixed distances from each other in a coolant flow channel or region forming a fuel assembly, and sufficient fuel assemblies are combined to form the nuclear fission chain reacting assembly or reactor core capable of self-sustained fission reaction. The core in turn is enclosed within a reactor vessel through which a coolant is passed.

The cladding serves several purposes and two primary purposes are: First, to prevent contact and chemical reactions between the nuclear fuel and the coolant or the moderator if a moderator is present, or both if both the coolant and the moderator are present, and second, to prevent the radioactive fission products, some of which are gases, from being released from the fuel into the coolant or the moderator or both if both the coolant and the moderator are present. Common cladding materials are steel, and its alloys, zirconium and its alloys, niobium (columbium) and its alloys, and the like. The failure of the cladding, i.e., a loss of the leak tightness, can contaminate the coolant or moderator and the associated systems with radioactive fission products to a degree which interferes with plant operation.

Problems have been encountered in the manufacture and in the operation of nuclear fuel elements which employ certain metals and alloys as the clad material due to mechanical or chemical reactions of these cladding materials under certain circumstances. Zirconium and its alloys, under normal circumstances, are excellent nuclear fuel claddings since they have low neutron absorption cross sections are strong, ductile, extremely stable and at temperatures below about 750° F. (about 398° C.) non-reactive in the presence of demineralized water and/or steam which are commonly used as reactor coolants and moderators.

However, fuel element performance has revealed a problem with defecting of the cladding due to the mechanical interactions between the nuclear fuel and the cladding in the presence of certain fission products produced by nuclear fission reactions. It has been discovered that this undesirable performance is promoted by localization of mechanical stresses (due to fuel-cladding differential expansion) at cracks and at pellet-pellet interfaces in the nuclear fuel. Corrosive fission products are released from the nuclear fuel and are present at pellet-pellet-interfaces and at the intersection of the fuel cracks with the cladding surface. Fission products are created in the nuclear fuel during the fission chain reaction during operation of nuclear reactor. The localized stress is exaggerated by high friction between the fuel and the cladding.

The zirconium alloy cladding of a nuclear fuel element is exposed to fission products during irradiation in a nuclear reactor. Sintered refractory and ceramic compositions, such as uranium dioxide and other compositions used as nuclear fuel, release quantities of the fission products during irradiation. Certain of these fission products are capable of reacting with the zirconium or zirconium alloy cladding containing the nuclear fuel.

Another approach to reactor design has been to coat the nuclear fuel material with a ceramic to prevent moisture coming in contact with the nuclear fuel material as disclosed in U.S. Pat. No. 3,108,936. U.S. Pat. No. 3,085,059 presents a fuel element including a metal casing containing one or more pellets of fissionable ceramic material and a layer of vitreous material bonded to the ceramic pellets so that the layer is between the casing and the nuclear fuel to assure uniformly good heat conduction from the pellets to the casing. U.S. Pat. No. 2,873,238 presents jacketed fissionable slugs of uranium canned in a metal case in which the protective jackets or coverings for the slugs are a zinc-aluminum bonding layer. U.S. Pat. No. 2,849,387 discloses a jacketed body section of nuclear fuel which have been dipped into a molten bath of a bonding material giving an effective thermally conductive bond between the uranium body sections and the container (or cladding). The coating is disclosed as any metal alloy having good thermal conduction properties with examples including aluminum-silicon and zinc-aluminum alloys. Japanese patent publication No. SHO 47-14200 in which the coating of one of two groups of pellets is coated with a layer of silicon carbide and the other group is coated with a layer of pyrocarbon or metal carbide.

The coating of a nuclear fuel material introduces reliability problems in that achieving uniform coatings free of faults is difficult. Further, the deterioration of the coating can introduce problems with the performance life of the nuclear fuel material.

U.S. patent application Ser. No. 330,152, filed Feb. 6, 1973, discloses a method for preventing defecting of nuclear fuel cladding consisting of the addition of a metal such as niobium to the fuel. The additive can be in the form of a powder, provided the subsequent fuel processing operation does not oxidize the metal, or incorporated into the fuel element as wires, sheets or other forms in, around, or between fuel pellets.

Document GEAP-4555, dated February 1964, discloses a composite cladding of a zirconium alloy with an inner lining of stainless steel metallurgically bonded to the zirconium alloy, and the composite cladding is fabricated by use of extrusion of a hollow billet of the zirconium alloy having an inner lining of stainless steel. This cladding has the disadvantage that the stainless steel layer involves a neutron absorption penalty of about ten to fifteen times the penalty for a zirconium alloy layer of the same thickness.

U.S. Pat. No. 3,502,549 discloses a method of protecting zirconium and its alloys by the electrolytic deposition of chrome to provide a composite material useful for nuclear reactors. A method for electrolytic deposition of copper on Zircaloy-2 surfaces and subsequent heat treatment for the purpose of obtaining surface diffusion of the electrolytically deposited metal is presented in *Energia Nucleare,* Volume 11, number 9 (September 1964) at pages 505–508. In *Stability and Compatibility of Hydrogen Barriers Applied to Zirconium Alloys,* by F. Brossa et al (European Atomic Energy Community, Joint Nuclear Research Center, EUR 4098e 1969), methods of deposition of different coatings and their efficiency as hydrogen diffusion barriers are described along with an Al-Si coating as the most promising barrier against hydrogen diffusion. Methods for electroplating nickel on zirconium and zirconium tin alloys and heat treating these alloys to produce alloy-diffusion bonds are disclosed in *Electroplating on Zirconium and Zirconium-Tin,* by W. C. Schickner et al (BM1-757, Technical Information Service, 1952). U.S. Pat. No. 3,625,821 presents a fuel element for nuclear reactor having a fuel cladding tube with the inner surface of the tube being coated with a retaining metal of low neutron capture cross section such as nickel and having finely dispersed particles of a burnable poison disposed therein. *Reactor Development Program Progress Report* of August, 1973 (ANL-RDP-19) discloses a chemical getter arrangement of a sacrificial layer of chromium on the inner surface of a stainless steel cladding.

Another approach has been to introduce a barrier between the nuclear fuel material and the cladding, as disclosed in U.S. Pat. No. 3,230,150 (copper foil), German patent publication DAS No. 1,238,115 (titanium layer), U.S. Pat. No. 3,212,988 (sheath of zirconium, aluminum or beryllium), U.S. Pat. No. 3,018,238 (barrier of crystalline carbon between the $UO_2$ and the zirconium cladding, and U.S. Pat. No. 3,088,893 (Stainless steel foil. While the barrier concept proves promising, some of the foregoing references involve incompatible materials with either the nuclear fuel (e.g., carbon can combine with oxygen from the nuclear fuel), or the cladding (e.g., copper and other metals can react with the cladding, altering the properties of the cladding), or the nuclear fission reaction (e.g., by acting as neutron absorbers). None of the listed references disclose solutions to the recently discovered problem of localized chemical-mechanical interactions between the nuclear fuel and the cladding.

Further approaches to the barrier concept are disclosed in U.S. patent application Ser. No. 441,131, filed Feb. 11, 1974 (refractory metal such as molybdenum, tungsten, rhenium, niobium and alloys thereof in the form of a tube or foil of single or multiple layers or a coating on the internal surface of the cladding), and U.S. patent application Ser. No. 441,133, filed Feb. 11, 1974 (liner of zirconium, niobium or alloys thereof between the nuclear fuel and the cladding with a coating of a high lubricity material between the liner and the cladding).

An additional effort to the solution of protecting the zirconium or zirconium alloy cladding container is shown in Gordon et al U.S. Pat. No. 4,029,545 assigned to the same assignee as the present invention. In this application, a layer, such as chromium, is electroplated onto a zirconium or zirconium alloy substrate, followed by the electroplating of copper onto the chromium layer. However, it has been found to be economically unattractive to electroplate the zirconium or zirconium alloy cladding, which hereinafter may be referred to as the "zirconium cladding", with chromium rendering the overall procedure less promising than originally anticipated. An alternative procedure is shown by Gordon et al U.S. Pat. No. 4,022,662, which shows a nuclear fuel element having a metal liner, such as a copper liner, between the cladding and the nuclear fuel and diffusion barrier, such as a chromium coating between the liner and the cladding. Again, the Gordon et al nuclear fuel element is uneconomic because electrodeposition is required and a copper liner has to be fabricated. Research effort has therefore been continually directed toward an economic solution of the problem of preventing perforations or failures in the cladding substrate resulting from metal embrittlement or stress corrosion cracking involving fuel pellet-cladding interaction.

SUMMARY OF THE INVENTION

The present invention is based on the discovery that a substantial reduction in metal embrittlement or stress corrosion cracking from fuel pellet-cladding interaction can be achieved by the employment of a copper layer or liner in proximity to the nuclear fuel and an intermediate zirconium oxide barrier layer between the copper layer and the zirconium cladding substrate. Advantageously, the intermediate zirconium oxide barrier layer has been found to be an excellent copper diffusion barrier. In addition, although copper cannot be directly electroplated onto non-conducting zirconium oxide, it has been found that modification of the zirconium cladding surface prior to oxidation, allows for copper deposition by electroless plating.

One aspect of the invention therefore is directed to a nuclear fuel element having a zirconium container resistant to stress corrosion cracking or embrittlement, said nuclear fuel element consisting essentially of:

(a) an elongated zirconium container for nuclear fuel having its interior surface oxidized to provide a zirconium oxide coating and a coating thereon of at least one metal selected from the class consisting of copper, nickel and iron, and alloys thereof on said zirconium container;

(b) at least one body of nuclear fuel material enclosed within the interior of said zirconium container sized to provide a space between said body and the inner surface of the zirconium container, said nuclear fuel material consisting essentially of a member selected from the class consisting of uranium oxide, plutonium oxide, thorium oxide and mixtures thereof.

A further aspect of the invention is directed to a method for making a composite zirconium or zirconium alloy container for nuclear fuel material to produce a nuclear fuel element which comprises (1) etching or roughening the surface of the zirconium or zirconium alloy container, (2) oxidizing the surface of the resulting nuclear fuel container of (1) to produce a zirconium or zirconium alloy container having a zirconium oxide coating, (3) activating the zirconium oxide coated surface of the nuclear fuel container of (2) to allow for the metallic coating of such surface by electroless deposition, and (4) further coating the zirconium oxide layer on the inside surface of the nuclear fuel container with a metal.

DESCRIPTION OF THE INVENTION

Figure 1:
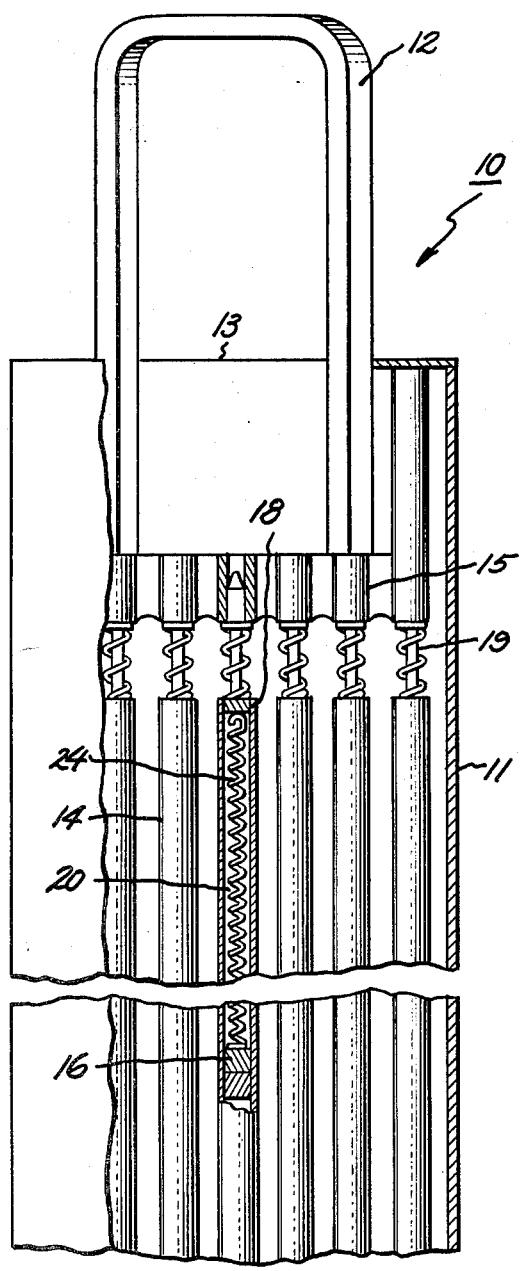
FIG. 1 presents a partial cutaway sectional view of a nuclear fuel assembly containing nuclear fuel elements constructed according to the teaching of this invention.

Referring now more particularly to FIG. 1, there is shown a partially cutaway sectional view of a nuclear fuel assembly 10. This fuel assembly 10 consists of a tubular flow channel 11 of generally square cross section provided at its upper end with lifting bale 12 and at its lower end with a nose piece (not shown due to the lower portion of assembly 10 being omitted). The upper end of channel 11 is open at 13 and the lower end of the nose piece is provided with coolant flow openings. An array of fuel elements or rods 14 is enclosed in channel 11 and supported therein by means of upper end plate 15 and a lower end plate (not shown due to the lower portion being omitted). The liquid coolant ordinarily enters through the openings in the lower end of the nose piece, passes upwardly around fuel elements 14, and discharges at upper outlet 13 in a partially vaporized condition for boiling reactors or in an unvaporized condition for pressurized reactors at an elevated temperature.

The nuclear fuel elements or rods 14 are sealed at their ends by means of end plugs 18 welded to the cladding 17, which may include studs 19 to facilitate the mounting of the fuel rod in the assembly. A void space or plenum 20 is provided at one end of the element to permit longitudinal expansion of the fuel material and accumulation of gases released from the fuel material. A nuclear fuel material retainer means 24 in the form of a helical member is positioned within space 20 to provide restraint against the axial movement of the pellet column, especially during handling and transportation of the fuel element.

The fuel element is designed to provide an excellent thermal conductance between the fuel and the cladding material, and to avoid bowing and vibration which is occasionally caused by flow of the coolant at high velocity.

A nuclear fuel element or rod 14 is shown in a partial section in FIG. 1 constructed according to the teachings of this invention. The fuel element 14 includes a core or central cylindrical portion of nuclear fuel material 16, here shown as a plurality of fuel pellets of fissionable and/or fertile material positioned within a structural cladding or container 17. In some cases the fuel pellets may be of various shapes such as cylindrical pellets or spheres, and in other cases different fuel forms such as a particulate fuel may be used. The physical form of the fuel is immaterial to this invention. Various nuclear fuel materials may be used including uranium compounds, plutonium compounds, thorium compounds, and mixtures thereof. A preferred fuel is uranium dioxide or a mixture comprising uranium dioxide and plutonium dioxide.

Figure 2:
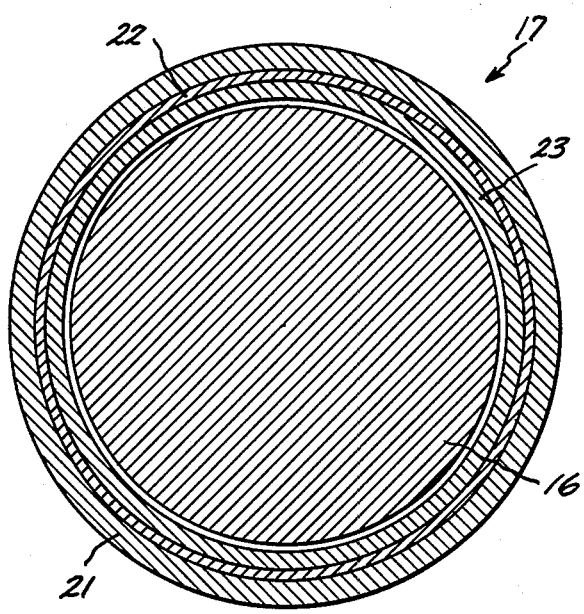
FIG. 2 presents an enlarged cross sectional view of the nuclear fuel element illustrating the teaching of this invention.

Referring now to FIG. 2, the nuclear fuel material 16 forming the central core of the fuel element 14 is surrounded by a cladding 17 hereinafter in this description also referred to as a composite and as a composite cladding. The composite cladding 17 has a zirconium or zirconium alloy such as Zircaloy-2 substrate at 21. The substrate has attached on the inside surface thereof, a diffusion barrier 22 so that the diffusion barrier 22 forms a shield preventing any diffusion of other species through the diffusion barrier 22 to the substrate 21. The diffusion barrier 22 is about 0.05–2.0$\mu$ and preferably 0.5–1.0$\mu$ in thickness and is comprised of zirconium dioxide. The diffusion barrier protects the substrate at 21 from contact and reaction with the metallic layer at 23.

The diffusion barrier 22 has attached thereon a metal layer 23 so that the metal layer 23 covers the diffusion barrier 22 and also forms a shield for the substrate against fission products and gaseous impurities emanating from the nuclear fuel material held in the container. The metal layer is about 1–20$\mu$ and preferably 5 to 10$\mu$ in thickness and is composed of a low neutron penalty metal which is preferably copper, but can include a metal selected from the group consisting of copper, nickel, iron and alloys thereof. The copper layer serves as a primary or preferential reaction site for fission products and also acts as a barrier to protect the substrate from contact and reaction with deleterious fission products. As shown in FIG. 2, the nuclear fuel material at 16 is sized to provide a space or gap between the nuclear fuel material and the metal layer.

The purity of the copper layer is important from a neutron penalty aspect. The total impurities in the two layers are limited to a boron equivalent of 40 parts per million or less. In addition, impurities should be kept at a level of less than one weight percent and preferably below 1000 parts per million to maintain high ductility and good thermal conductance.

The composite cladding of the nuclear fuel element of this invention has the diffusion barrier bonded to the substrate in a strong bond and the metal layer bonded to the diffusion barrier in a strong bond. Tests to show the bond strength between the diffusion barrier and the substrate show that the diffusion barrier remains firmly affixed when bent in the elastic region or when permanently strained to about 2%.

The copper layer is more resistant to the deleterious effects of radiation hardening the damage than zirconium and zirconium alloys under the conditions found in commercial nuclear fission reactors, e.g. at temperatures of 500° F. to 750° F. Thus, copper has more ability to withstand plastic deformation without mechanical failure than zirconium and zirconium alloys under operating nuclear reactor conditions. In addition, copper can deform plastically from pellet-induced stresses during power transients, relieving pellet-induced stresses. In addition, these metals will not rupture mechanically and thus will also shield the zirconium alloy substrate from the deleterious action of fission products.

It has been discovered that the above described metal layer bonded to the diffusion barrier which in turn is bonded to the substrate of zirconium or a zirconium alloy provides stress reduction and chemical resistance sufficient to prevent nucleation of failures in the substrate of the cladding. The metal layer provides significant chemical resistance to fission products and gases that may be present in the nuclear fuel element and prevents these fission products and gases from contacting the substrate of the composite cladding protected by the metal barrier.

It has been discovered, for example, the copper layer does not oxidize to any appreciable extent, and the stoichiometry of the $UO_2$ fuel can be stabilized. Without the copper layer, the zirconium or zirconium alloy would react with the oxide nuclear fuel forming $ZrO_2$, thus changing the stoichiometry of the oxide nuclear fuel. The chemical state of various fission products is a very strong function of the oxide nuclear fuel stoichiometry. For example, at higher oxygen to uranium ratios, cesium forms a compound with the $UO_2$ fuel. At lower ratios, this compound is not stable and cesium can migrate to the lower temperature regions of the fuel rod (e.g., inner surface of the cladding). Cesium, either alone or in combination with other fission products, may then promote stress corrosion of the cladding. In a fuel rod with an uncoated cladding, even if the oxide nuclear fuel has a high initial oxygen to uranium ratio, the oxygen consumed by the oxidation of the zirconium alloy will lower this ratio, and cesium can then be released to migrate to the cladding surface. With the present invention using a diffusion barrier and a metal layer, the ratio will remain nearly constant or change at a reduced rate. Thus, an oxide nuclear fuel with any desired stiochiometry can be used in the composite cladding with the expectation that this stoichiometry will remain constant or change with time at a much slower rate.

In the practice of the invention, the zirconium or zirconium alloy container, referred to hereinafter as the zirconium substrate, zirconium container or zirconium tube can be converted to the composite cladding consisting of the zirconium container with a copper coating on its inside surface in contact with an intermediate zirconium oxide boundary layer by initially modifying the inside surface of the zirconium container. Modification of the inside surface of the zirconium container can be achieved by either a grit blasting or roller milling technique or by using a particular etchant. After the zirconium surface has been modified, it is oxidized. The oxidized surface of the zirconium substrate is then activated to allow for the electroless plating of a metal such as copper onto the zirconium oxide.

If the inside surface of the zirconium tube is modified by the surface roughening technique, the zirconium surface can be roughened by grit blasting with an aluminum oxide grit or by internal roller milling using weighted aluminum oxide tubing having an outside diameter of from about 8 to 10 millimeters and an inside diameter of from about 5 to 7 millimeters. Roller milling of the zirconium tube can be achieved with wet powdered aluminum oxide by plugging the ends of the tube and rolling the tube for 24 to 72 hours at from 12 to 20 RPM.

When employing the etching method to modify the inside surface of the zirconium tube, the inside of the tube is preferably initially cleaned with a detergent, exposed to a bright dip solution, and thereafter washed. A preferred etchant is shown by patent application Ser. No. 522,767 of Daniel E. Wax and Robert L. Cowan, filed Nov. 11, 1974 and assigned to the same assignee as the present invention. A typical etching procedure would be to contact the zirconium alloy with an aged aqueous activating solution comprising from about 10 to 20 grams per liter of ammonium bifluoride and from about 0.75 to about 2.0 grams per liter of sulfuric acid. The solution can be aged by immersion of a piece of zirconium having an area of 100 sq. centimeters, per liter of solution, for 10 minutes. The etched surface of the zirconium tube can then optionally be scaled to effect the removal of loosely adhering film.

Oxidation of the above described surface roughened zirconium tube or etched and scaled zirconium tube can be accomplished by exposure to an oxygen atmosphere at 300° C. to 500° C. over a period of from 1 to 100 hours. Alternatively, surface oxidation can be effected by treating the inside surface of the zirconium tube after modification with steam at a temperature of from 350°–450° C. over a period of from 5 to 50 hours.

Experience has shown that activation of the oxidized surface of the zirconium tube can be achieved by employing salts of tin and salts of various noble metals. A preferred combination is alkaline solutions of stannous tin, such as sodium stannite and palladium chloride. However, other noble metal salts can be used, such as silver nitrate, platinum chloride, gold chloride, alkaline solutions of precious metals, such as sodium aurate, sodium palladate, sodium platinate. A typical activating mixture is shown by C. R. Shipley U.S. Pat. No. 3,011,920 or E. Saubestre Technical Proceedings, American Electroplating Society 1959. The oxidized zirconium surface is treated with Cuposit Catalyst 9F, a product of the Shipley Company of Newton, Mass. The treated zirconium oxide can then be rinsed further with water and treated with Cuposit Accelerator 19, also a product of the Shipley Company.

The electroless plating of the activated zirconium oxide coated zirconium substrate can be achieved by standard procedures, such as by allowing the plating solution to flow uniformly through or over the zirconium substrate to achieve a uniform buildup of metal on the article. Although copper is the preferred metal, other metals such as nickel or iron also can be plated onto the surface of the zirconium oxide to achieve effective results.

For electroless plating, an aqueous bath of the following composition can be used: 600 ml of $H_2O$, 141.5 grams of sodium potassium tartrate ($KNaC_4H_4O_6.4H_2O$), 41.5 grams of sodium hydroxide (NaOH), 29 grams of copper sulfate ($CuSo_4.5H_2O$) plus $H_2O$ to make 1 liter. Immediately prior to use, 16.7 ml of a 73% formaldehyde solution ($H_2CO$) can be added to the bath. This is a version of well known Fehling's copper plating bath. Other proprietary electroless copper plating formulations can be employed, such as those identified as MacDermid 9038, Shipley CP74 and Sel-Rex CU510. The plating bath is agitated and passed uniformly over the article to be plated while being maintained at a temperature of about 25° to about 75° C. This procedure produces a very good as-plated adherence with substantially no porosity. In order to insure that the plated article can be used at elevated temperatures without any substantial loss of adhesion, the plated aritcle is out-gassed in either argon or vacuum at a temperature of about 300° to about 400° F. (149° to 204° C.). In this out-gassing, the temperature is raised from ambient to the final temperature at a rate of about 50° F. to 125° F. per hour.

During the electroless plating of copper on the article, a considerable quantity of hydrogen gas can be evolved. Inasmuch as hydrogen gas can interfere with the electroless plating process, since it has a tendency to adhere to the wall of the tube, hydrogen removal can be facilitated by pumping the plating solution through the tube. In addition, the tube can be electroless plated while it is in a vertical position.

For plating nickel on zirconium, an aqueous bath of the following composition is employed: 30 grams/liter of nickel chloride ($NiCl_2.6H_2O$), 10 grams/liter of sodium hypophosphite ($NaH_2PO_2.H_2O$), 12.6 grams/liter of sodium citrate ($Na_3C_6H_5O_7.2H_2O$), 5 grams/liter of sodium acetate ($NaC_2H_3O$) and sufficient sodium hydroxide (NaOH) to give a pH in the range of 4 to 6. Other proprietary electroless nickel plating formulations can be employed such as those identified as Enplate 410 and Enplate 416. The plating bath is agitated and passed uniformaly over the article to be plated while being maintained at a temperature of about 194° to about 212° F. (90° to 100° C.) with a preferred target temperature being 95°±2° C. This procedure produces a very good as-plated adherence with no porosity. In order to insure that the plated article can be used at elevated temperatures without any substantial loss of adhesion, the same out-gassing procedure employed above for copper is used.

The articles treated by the process of this invention can be zirconium material taken directly from milling operations or can be articles subjected to prior mechanical cleaning (e.g., grit blasting) or chemically cleaned articles (e.g., cleaned by acid and/or alkaline etching).

In order that those skilled in the art will be better able to practice the invention, the following examples are given by way of illustration and not by way of limitation.

EXAMPLE 1

A zircaloy-2 tube, 5 inches long having a 0.490 inch OD and 0.425 ID is cleaned in a detergent solution for 10 minutes in a 50 watt ultrasonic cleaner. It is then rinsed 10 minutes in distilled water. There is then pumped through the tube at a rate of about 1000 ml/min for 2 minutes a bright polish solution consisting of 500 ml of $H_2O$, 500 ml of concentrated nitric acid and 10 grams of ammonium bifluoride. The tube is then rinsed with water and neutralized in an aqueous sodium hydroxide solution. After a 5 minute rinse in distilled water, the tube is etched for 1 minute in the ultrasonic cleaner, using a solution of 1000 ml of water, 15 grams of ammonium bifluoride and 0.5 ml of sulfuric acid. The etching solution has been previously mixed and aged for 10 minutes by contacting it with a piece of Zircaloy-2 tube having an area of about 100 square centimeters. The ultrasonic cleaner effects the removal of any loose scaly material which is formed during etching. After etching, the sample is then rinsed for about 1 minute in distilled water and thereafter dried using dry nitrogen. The tube is then put in a furnace for oxidizing. The tube is oxidized 24 hours at 400° C. using an oxygen flow of about 0.2 cubic feet per hour. When the tube has cooled, it is removed from the furnace and cleaned again in an aqueous sodium hydroxide solution for 5 minutes in the ultrasonic cleaner, followed by a 10 minute rinse in distilled water.

The tube is then activated by initially pumping through it a solution of Cuposit Catalyst 9F manufactured by the Shipley Company of Newton, Mass., at a rate of 1000 ml/min for a period of 3 minutes and then rinsed for 3 minutes. There is then pumped through the Zircaloy-2 tube, a solution of Cuposit Accelerator 19 for 6 minutes at a rate of about 1000 ml/min, followed by a 10 minute rinse in distilled water. The tube is then plated for 2 hours at 60° C. in Metex #9038 plating bath, a commercial product manufactured by MacDermid Inc., of Waterford, Conn. The plating bath is pumped through the sample tube at a rate of 1000 ml/min from a vessel having a thermostatic control. There is obtained a composite Zircaloy-2 tube cladding coated on its inside surface with about $3.8 \times 10^{-4}$ inch of copper and intermediate boundary layer of about $4 \times 10^{-5}$ inch of zirconium oxide. The aforementioned Zircaloy-2 tube composite is then loaded in accordance with standard techniques using 0.4 inch × 1.5 inch uranium oxide pellets to produce a nuclear fuel element useable in the core of a nuclear reactor.

In order to demonstrate the outstanding ability of zirconium oxide as a barrier layer between a copper coating and a zirconium substrate as a means for reducing metal embrittlement or failure under reactor conditions, i.e., temperatures, such as in excess of 290° C. while in contact with cadmium dissolved in cesium, etc., a series of ½ inch long Zircaloy-2 tensile samples were prepared having a ⅛ inch gauge section. The tensile samples were evaluated on an Instron tensile tester at 300° C. while in a bath of liquid cesium saturated with cadmium. Some of the tensile samples were heat treated at about 580° C. for 2¼ hours in argon or in vacuum prior to the aforementioned tensile test in liquid cesium.

The tensile samples evaluated were (A) uncoated Zircaloy-2, (B) copper coated Zircaloy-2 and (C) Zircaloy-2 coated with copper and having an intermediate boundary layer of zirconium oxide between the copper and the Zircaloy-2 substrate. The following table shows the results obtained, where "yes" under "Heat Treatment" indicates that the tensile sample was exposed 2¼ hours to a temperature of 580° C. in argon or in vacuo prior to the Instron tensile test.

|   | Heat Treatment | Plastic Strain at Fracture |
|---|---|---|
| A | No | 0% |
|   | Yes | 0% |
| B | No | 1.5% |
|   | Yes | 0% |
| C | No | 1.5% |
|   | Yes | 3.8% |

The above results establish that Zircaloy-2 tensile sample (C) coated with copper and with an intermediate boundary layer of zirconium oxide exhibited the largest plastic strain at fracture. Surprisingly, the 3.8% plastic strain at fracture was even larger under the hostile environment of liquid cesium saturated with cadmium after heat treatment as compared to the plastic strain at fracture of the tensile sample which had not been heat treated. These technical facts would suggest that a nuclear fuel element made in accordance with the present invention under actual service conditions over an extended period of time would exhibit a superior resistance to failure. The zirconium cladding would resist embrittlement to a greater extent since it would be protected by the copper barrier which in turn would be prevented by the zirconium oxide barrier from diffusing into the zirconium substrate. Those skilled in the art also know that even a 1% plastic strain at fracture would indicate resistance to cracting of a significant degree. Also significant is the failure exhibited by the (B) tensile sample protected only by a copper barrier after heat treatment. The diffusion of copper into the zirconium substrate when heated to 580° C. resulted in embrittlement and failure as indicated by the 0% plastic strain at fracture since there was no zirconium oxide barrier.

EXAMPLE 2

The procedure of Example 1 was repeated except that instead of etching the zirconium tube prior to oxidation, a 1 × 1.5 cm flat coupon was grit blasted by mechanical attrition with aluminum oxide grit of 90 mesh size for 10 seconds. The grit blasted coupon was then oxidized at 400° C. for 24 hours in accordance with the procedure of Example 1.

EXAMPLE 3

The procedure of Example 2 was repeated except a Zircaloy-2 tube was used in place of the flat coupon. Surface roughening was achieved by roller milling, using as the roller, an aluminum oxide tube having a 0.31 inch OD and 0.28 inch ID. The aluminum oxide tube was filled with mercury to give it added weight and placed inside the Zircaloy-2 tube along with wet aluminum oxide grit, 90 mesh size as previously described. The tube was rolled with the ends stoppered to prevent loss of the grit and water for 64 hours at 128 RPM. The tube was then washed with distilled water and surface oxidized at 400° C. for 24 hours as previously described.

The above oxidized samples were then activated in accordance with the procedure of Example 1 followed by electroless plating with copper. The resulting Zircaloy-2 samples resembled each other in appearance as well as resembling the Zircaloy-2 tube coated with copper and zirconium oxide as described in Example 1.

Although the above examples are directed to only a few of the very many variables which can be used in the method of the present invention to provide a variety of useful nuclear fuel elements and cladding for containing nuclear fuel, it should be understood that a much broader variety of materials and procedures can be utilized as set forth in the description preceding these examples.

What we claim as new and desire to secure by Letters Patent of the United States is:

1. A method for preventing stress corrosion cracking or metal embrittlement of a zirconium or zirconium alloy container useful for holding nuclear fuel material to provide for the production of an improved nuclear fuel element, which comprises
   (1) roughening the surface of the zirconium or zirconium alloy container by mechanical attrition,
   (2) oxidizing the resulting zirconium or zirconium alloy container,
   (3) activating the oxidized surface of (2) to allow for the metallic coating of such surface by electroless deposition, and
   (4) further coating the activated-oxidized surface of the zirconium or zirconium alloy container of (3) with a metal selected from copper, iron and nickel.

2. A method in accordance with claim 1, where the zirconium oxide surface is electroless plated with copper.

3. A method in accordance with claim 1, where the oxidizing is achieved by heating the zirconium alloy in steam at elevated temperatures.

4. A method in accordance with claim 1, where oxidation of the zirconium alloy is effected in an oxygen atmosphere at elevated temperatures.

* * * * *